# United States Patent [19]

Sessum

[11] Patent Number: 4,591,675
[45] Date of Patent: May 27, 1986

[54] EMERGENCY VEHICLE BATTERY CIRCUIT BREAKER

[76] Inventor: Charles E. Sessum, 701 Fleming Ct., Houston, Tex. 77013

[21] Appl. No.: 624,223

[22] Filed: Jun. 25, 1984

[51] Int. Cl.⁴ .................... H01H 3/16; H01H 17/08; H01H 35/00
[52] U.S. Cl. .................. 200/52 R; 200/61.7; 200/161; 200/162
[58] Field of Search ............... 200/16 B, 16 E, 16 F, 200/52 R, 61.45 R, 61.5, 61.52, 161, 162, 254

[56] References Cited

U.S. PATENT DOCUMENTS

| | | | |
|---|---|---|---|
| 1,935,509 | 11/1933 | Leeah et al. | 200/161 |
| 2,117,307 | 5/1938 | Frank et al. | 200/162 |
| 2,229,956 | 1/1941 | Butterfield | 200/162 |
| 2,513,172 | 6/1950 | Hassay | 200/161 X |
| 2,659,791 | 11/1953 | Dickinson | 200/161 |
| 3,047,689 | 7/1962 | Vardara | 200/61.45 R |
| 3,683,143 | 8/1972 | Moore | 200/161 X |
| 4,000,388 | 12/1976 | Carter et al. | 200/61.45 R X |

FOREIGN PATENT DOCUMENTS 1197152  7/1965  Fed. Rep. of Germany ...... 200/162

Primary Examiner—J. R. Scott
Attorney, Agent, or Firm—Kenneth H. Johnson

[57] ABSTRACT

An emergency vehicle circuit breaker having a non conductive base plate with two contacts thereon spaced apart to form a non conductive gap, one contact connected to a battery and one contact to an electric starter motor. A non conductive front plate is attached to the non conductive base plate by a hinge with a third contact thereon aligned with the gap to form an electrical contact between the two contacts on the base plate and a cable means for remote manual movement of the front plate toward and away from the base plate whereby the third contact may be engaged and disengaged from the gap, thereby making and breaking an electrical circuit.

12 Claims, 7 Drawing Figures

EMERGENCY VEHICLE BATTERY CIRCUIT BREAKER

BACKGROUND OF THE INVENTION

1. Field of the Invention

The present invention relates to a device for use in motor vehicles having battery operated starters to break the electrical circuit between the battery and the starter.

2. Related Art

At times it is desirable and/or necessary to break the electrical circuit in motor vehicles, for example in the case of certain electrical fires where the fire is the result of a short and the ignition key does not break the circuit. It has also been found that at least on certain U.S. produced diesel vehicles the failure of the engine to fire on starting, results in a ground of the battery through the starter, which continues to operate until the battery is dead. The problem with the aforementioned diesel vehicles can occur if the glow plugs are not functioning properly or if there is a problem in the fuel system, or in very cold weather. Hence, one problem in the starting operation of the diesels is compounded by a dead battery.

It is an advantage of the present system in that the circuit from the battery to the starter may be broken and reconstituted by the operator of the vehicles from the operator's position in the vehicle. It is a further advantage that the present invention is simple and not an automatic system out of the operator's control, which itself could fail. It is a further advantage that the inadvertent operation of the present device to break the circuit is easily reversed without any detriment to the electrical system.

The following description is intended to illustrate the invention and specific examples are not intended to limit its scope but will make the invention clearly understood.

SUMMARY OF THE INVENTION

Basically the present invention discloses a remotely operable electrical circuit breaker for use in vehicles, particularly those having a battery, i.e. a DC system, operated starter comprising:

A non conductor base member;

A first conductive member mounted to said base member and having connected thereto means to connect said first conductive member to a battery terminal, preferably the positive terminal;

A second conductive member mounted to said base member and having connected thereto means to connect said second conductive member to an electrical apparatus, preferably starter motor means, said second conductive member being spaced away from said first conductive member, whereby a non conductive gap is provided between said first and second conductive members;

A non conductive front member attached to said non conductive base member by a pivot (hinge means), and having a third conductive member mounted thereon and aligned with said gap whereby rotation of said non-conductive front member about said pivot toward said non conductive base member places said third conductive third member into said gap and into electrical contact with said first and second conductive members and whereby rotation of said non conductive front member about said pivot away from said non conductive base member removes said third conductive member from said gap and breaks electrical contact with said first and second conductive members, thereby breaking the electrical circuit; and A cable means attached to said non-conductive front member to provide for remote manual rotation of said non conductive front member about said pivot toward and away from said non conductive base member.

Preferably the conductive members are copper or other good electrical conductive materials. Although conductive members may be brought into electrical contact with close tolerances, it is preferable that at least one of the first or second conductive member be biased to force the surfaces thereof against the third conductive member. Preferably the first and second conductive contacts are biased toward the gap, such as spring like copper or copper alloy, with the third conductive member being slightly larger than the gap. The third conductive member may be a solid piece of conductive material or also a spring like structure biased toward the first and second conductive members.

The cable means for remote manipulation of the present circuit breaker is a conventional cable with a knob or other handle mounted on or near the control board of the vehicle such that operating the cable will engage and disengage the third conductive member from contact with the first and second conductive members thereby completing and break the circuit respectively. The cable may be sheathed.

The location of the present circuit breaker between the battery and the starter gives substantial control over the entire electrical system in a conventional negative ground electrical system, since the remainder of the electrical system operates from the starter electronics.

The principal advantages of the present system are (1) to allow the vehicle operator to be able to remove the source of an electrical fire or short and (2) to allow the operator to disengage a hung starter to thereby avoid a complete drain of the battery.

The same number of designations have been used in the figures to denote the same part in the alternative arrangements and embodiments.

DETAILED DESCRIPTION OF THE INVENTION

The same member designations have been used to describe the same elements on different embodiments.

Figure 1:
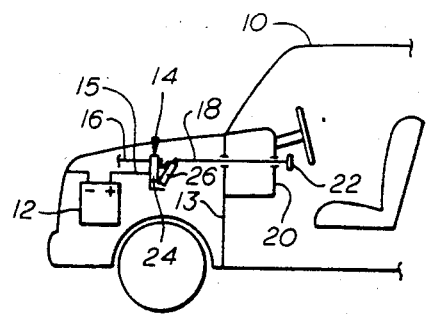
FIG. 1 is a schematic representation of the present device in a vehicle.

In FIG. 1 the general configuration of the present disconnector 14 (circuit breaker) in a vehicle 10 is depicted. The battery 12 is shown connected from the positive terminal by line 15 to the first conductive member (shown in detail below) of the present disconnector. The non conductive base member 24 is fixedly mounted in the engine compartment of the vehicle at a convenient place. A line 16 extends from the second conductive member (shown in detail below) to electrical components of the vehicle, e.g., the starter (not shown). In the embodiment shown in FIG. 1 the control cable 18 mounted through the dashboard 20 and handle 22 have been pulled to pivot the non conductive front member away from the fixed base member thereby breaking the electrical circuit. It should be appreciated that when the present device is mounted on the firewall 13 that pulling the cable 18 will engage the conductive members, whereas pushing the cable 18 will disengage the conductive members, because the device will have been rotated 180° for mounting on the firewall.

Figure 2:
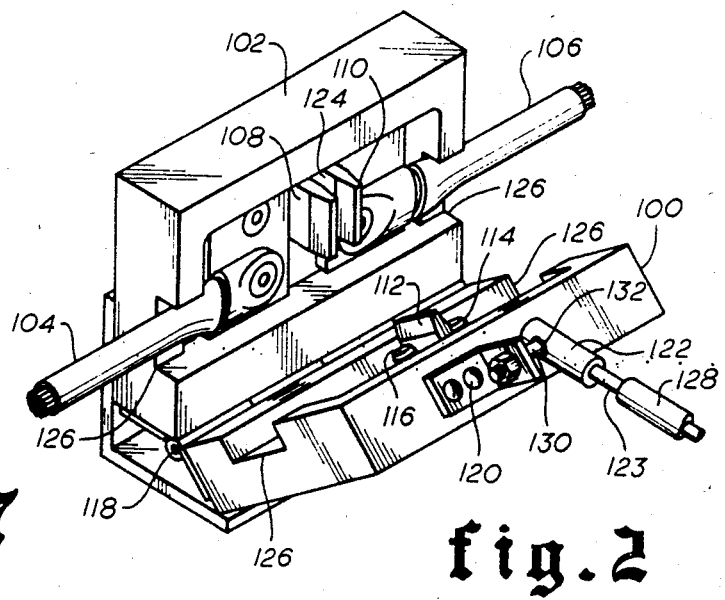
FIG. 2 is a perspective view of the present device in the disengaged mode.

FIG. 2 shows one embodiment, in the open or disengaged position, wherein each of the conductive members 108, 110 and 112 are relatively solid copper prongs preferably tapered at upper ends, that is the end of each conductive member extending away from and distal to the non conductive base member and non conductive front member, are tapered as shown, to prevent binding when the front member 100 and base member 102 are brought together. It should be noted that each of the conductive members are in this embodiment L shaped (cross section) elements wherein the vertical portion of the L forms the contact member. Attached to conductive member 108 is electrical cable 104 and to conductive member 110 electrical cable 106 with the non conductive gap 124, between the two conductive members.

The non conductive base member 102 and non conductive front member 100 are pivotally connected by hinge 118 along one edge, the lower edge (however the upper edge could also be used), and may be composed out of a hard resin called Bakelite, phenolic type resin, or other materials. A notch 126 is provided in each of these members to allow a slot for the cables 104 and 106. Preferably the base member and front member form a box like enclosure when the two portions are together in order to protect the contacts from engine and road dirt and grease. However, this is not required and the base and front members could be flat members with the contacts fully exposed. Elements 114 and 116 are described below.

Attached to the front member in bracket 120 which has the cable control 123 rotatably mounted thereon by means of rod 130 mounted through hole 132 in head 122. A cable cover 128 is also shown. The rod 130 can be a bolt.

Figure 3:
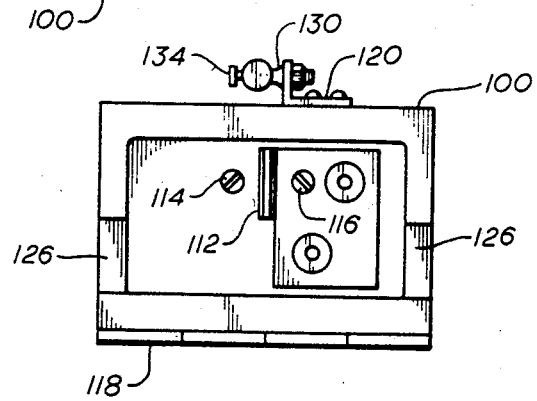
FIG. 3 is an elevational view of the front member of the device of FIG. 2.

In FIG. 3 the cap 134 is shown holding the rod 130 in place through the hole in the control cable head 122. The hole 132 is of course slightly larger than the rod 130 to allow for the relative rotation of the rod when the cable 123 is pushed or pulled by the operator.

The elements 114 and 116 are pins which tend to force the conductive members 108 and 110 toward conductive member 112 when the two halves of the device are in the engaged position.

The means of connecting the conductive members to the back and front members is not critical. As shown in the present drawing they attached by screws, however, brads, epoxy glue or another method of securing them fixedly in place may be used. However the screws 136 (FIG. 5) serve to connect the electrical cables 104 and 106 to the horizontal portions of the L shaped conductive members 108 and 110 as well as to secure the conductive members in place on the base.

Figure 5:
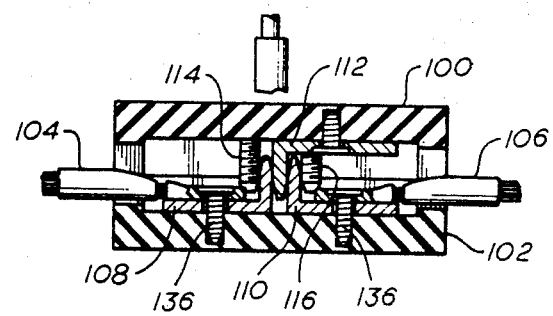
FIG. 5 is a cross sectional elevation of the device of FIG. 2 in the engaged mode.
Figure 4:
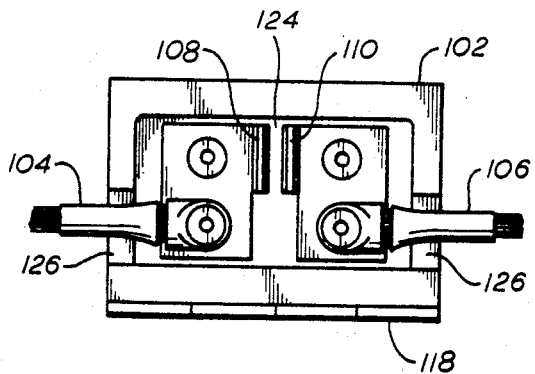
FIG. 4 is an elevational view of the base member of the device of FIG. 2.

In FIG. 5 the relationship of the elements previously described can be seen in the engaged position. The pins 114 and 116 tend to force conductive members 108 and 110 toward the gap 124, now occupied by conductive member 112 to improve the electrical contact and efficiency of the system.

Figure 6:
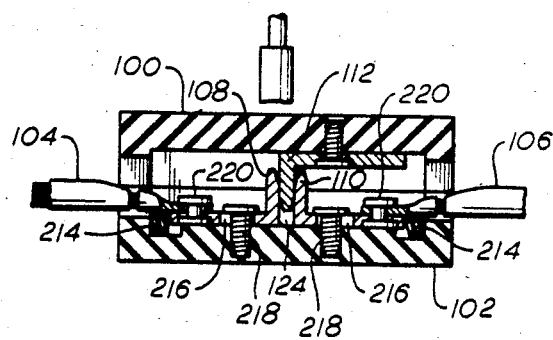
FIG. 6 is a cross sectional elevation of an alternative embodiment of the present device in the engaged mode.

In FIG. 6 a different means of forcing the conductive members 108 and 110 toward the gap and conductive member 112 is disclosed. A slot 216 is provided in each horizontal leg of the L shaped conductive members 108 and 110 such that those members will slide the length of the slot and through which the L shaped members 108 and 110 are mounted by screws 218 to the base member 102. A coil spring 214 is provided to bias at least one, and preferably both of the L shaped members toward the gap and conductive member 112. The electrical cables 104 and 106 are attached by screws 220 to the horizontal (and slidable) portion of the L shaped conductive members 108 and 110 respectively.

Figure 7:
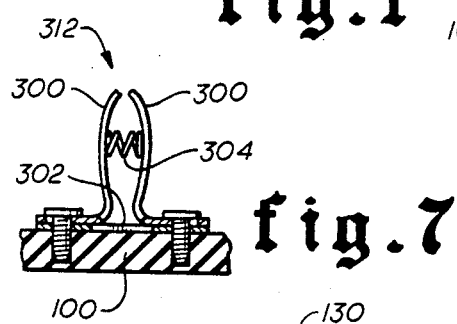
FIG. 7 is an alternative configuration for the third conductive member located on the non conductive front member.

FIG. 7 depicts an alternative configuration of the third conductive member (112 in FIGS. 2, 3, 5 and 6) wherein this element 312 is comprised of two conductive spring members 300 mounted to a conductive plate 302 and hence to the non conductive front member 100, said spring member 300 being biased away from each other, that is towards the conductive members 108 and 110 when in the engaged position. Additionally a coil spring 304 may bias the two elements 300 apart in order to improve the electrical contact when in the engaged position.

It should be appreciated that the base and front members and their related components could be reversed, however, the configuration depicted here is preferred.

The invention claimed is:

1. A remotely operable electrical circuit breaker for use in vehicles comprising:

a non conductor base member;

a first conductive member mounted to said base member and having connected thereto means to connect said first conductive member to a battery terminal;

a second conductive member mounted to said base member and having connected thereto means to connect said second conductive member to an electrical apparatus, said second conductive member being spaced away from said first conductive member, whereby a non conductive gap is provided between said first and second conductive members;

a non conductive front member attached along one edge to said non conductive base member along one edge by a pivot and having a third conductive member mounted thereon and aligned with said gap whereby rotation of said non conductive front member about said pivot toward said non conductive base member places said third conductive member into said gap and into electrical contact with said first and second conductive members forming an electrical circuit said conductive members being held in contact by friction, wherein said non conductive front member and said non conductive base member form an enclosure to protect said contacts when said contacts are engaged, and whereby rotation of said non conductive front member about said pivot away from said non conductive base member removes said third conductive member from said gap and discontinues electrical contact with said first and second conductive members, thereby breaking said electrical circuit; and a cable means attached to said non conductive front member to provide for remote manual rotation of said non conductive front member toward and away from said non conductive base member.

2. The circuit breaker according to claim 1 wherein said pivot is a hinge.

3. The circuit breaker according to claim 1 wherein said first and second conductive members are biased toward said gap.

4. The circuit breaker according to claim 1 wherein said electrical apparatus is an electric starter motor means.

5. The circuit breaker according to claim 1 wherein said conductive members are L shaped.

6. The circuit breaker according to claim 1 wherein said conductive members extend outwardly from said non conductive base member and said non conductive front member respectively.

7. The circuit breaker according to claim 6 wherein said conductive members are solid metal.

8. The circuit breaker according to claim 7 wherein said conductive members are tapered at the end distal to said non conductive base member and said non conductive front member respectively, to facilitate bringing said third conductive member into said gap between said first and second conductive members.

9. The circuit breaker according to claim 1 wherein at least one of said first and second conductive members is biased toward said gap.

10. The circuit breaker according to claim 9 wherein at least one of said first and second conductive members is slidably mounted to said non conductive base member.

11. The circuit breaker according to claim 1 wherein said first and second conductive members are slidably mounted to said non conductive base member and biased toward said gap.

12. The circuit breaker according to claim 1 wherein said third conductive member is biased toward said first and second conductive members when said third conductive member is seated in said gap.

* * * * *